(12) United States Patent
Hunt

(10) Patent No.: US 11,414,033 B2
(45) Date of Patent: Aug. 16, 2022

(54) VEHICULAR APRON SYSTEM

(71) Applicant: Gene Clifford Hunt, Chicago, IL (US)

(72) Inventor: Gene Clifford Hunt, Chicago, IL (US)

( * ) Notice: Subject to any disclaimer, the term of this patent is extended or adjusted under 35 U.S.C. 154(b) by 0 days.

(21) Appl. No.: 17/646,064

(22) Filed: Dec. 27, 2021

(65) Prior Publication Data

US 2022/0118929 A1  Apr. 21, 2022

Related U.S. Application Data

(63) Continuation-in-part of application No. 17/248,435, filed on Jan. 25, 2021, now Pat. No. 11,208,056, which is a continuation-in-part of application No. 16/791,705, filed on Feb. 14, 2020, now abandoned.

(51) Int. Cl.
| | |
|---|---|
| *B60R 19/20* | (2006.01) |
| *B60R 19/48* | (2006.01) |
| *G01S 7/481* | (2006.01) |
| *G01S 17/89* | (2020.01) |
| *G01S 17/04* | (2020.01) |

(52) U.S. Cl.
CPC .......... *B60R 19/20* (2013.01); *B60R 19/483* (2013.01); *G01S 7/4813* (2013.01); *G01S 17/04* (2020.01); *G01S 17/89* (2013.01)

(58) Field of Classification Search
CPC ..... B60R 19/20; B60R 19/483; G01S 7/4813; G01S 17/04; G01S 17/89
USPC .......................................................... 293/128
See application file for complete search history.

(56) References Cited

U.S. PATENT DOCUMENTS

| | | | | |
|---|---|---|---|---|
| 5,890,525 A | * | 4/1999 | Shores | B60J 11/00 200/522 |
| 6,405,132 B1 | * | 6/2002 | Breed | G05D 1/0274 701/45 |
| 8,444,191 B2 | * | 5/2013 | Akers | B60R 13/04 293/128 |
| 11,072,307 B1 | * | 7/2021 | Baccouche | B60R 19/205 |

FOREIGN PATENT DOCUMENTS

GB  2457728 A  *  8/2009  ............. B60R 19/42

* cited by examiner

*Primary Examiner* — Pinel E Romain
(74) *Attorney, Agent, or Firm* — Dunlap Bennett & Ludwig, PLLC

(57) ABSTRACT

A vehicular apron system is provided. The vehicular apron is dimensioned and adapted to extend the length of a door of the vehicle at its outward-most portion, thereby absorbing damage that would otherwise be imparted into the underlying door. The bellow elements have accordion sidewalls which facilitates their movement between a uninflated condition and an expanded condition for absorbing impact. The LIDAR situational awareness functionality is operatively associated with the inflation valves fluidly coupled to the bellow elements, wherein these bellow elements are automatically urged to an expanded condition in response to an object within the vicinity of the vehicle. The LIDAR situational awareness functionality provides video output to be used as evidence in cases of theft or contested accidents.

8 Claims, 8 Drawing Sheets

VEHICULAR APRON SYSTEM

CROSS-REFERENCE TO RELATED APPLICATION

This application claims the benefit of priority of U.S. Non-provisional application Ser. No. 16/791,705 filed 14 Feb. 2020, and application Ser. No. 17/248,435 filed 25 Jan. 2021 as a Continuation-In-Part thereof, the contents of which are herein incorporated by reference.

BACKGROUND OF THE INVENTION

The present invention relates to automobile accessories and equipment and, more particularly, to a vehicular apron adapted to prevent superficial damage to doors of the vehicle from adjacent cars or other objects.

Scrapes and dents from the accidental contact with adjacent vehicles can frustrate any owner. Typically, such scrapes and dents happen when two cars are parked too close together, and one of the two cars opens their door in a negligent manner.

As can be seen, there is a need for a vehicular apron for preventing surface damage to the doors of a car from contact with adjacent cars. The vehicular apron embodied in the present invention is adapted so as not be removed unless the door is opened through engaging the lip of the door of the vehicle, and so cannot be removed by, for example, the brushes in a car wash.

Additionally, the present invention provides an outward-facing surface for displaying messages along the side of the vehicle wherein such displays are not permanently attached to the vehicle, unlike a bumper sticker.

Furthermore, the present invention in one embodiment uses LIDAR to enable a situational awareness functionality, wherein the system can measure and make the overall systemic bellow strips and piles responsive to an object within a range selectively set by the user. LIDAR determines ranges (variable distance) by targeting the object with a laser and measuring the time for the reflected light to return to the receiver. This situational awareness can be used in numerous advantageous manners including notifying the vehicle owner via video that someone is about to enter the vehicle, that a pedestrian is within a predetermined distance of the vehicle as well as there is another vehicle within another set predetermined distance and about to possibly impact the vehicle.

The LIDAR situational awareness functionality reduces the expense that would otherwise have to be paid for if the vehicle owners was not aware of the proximity of threats—i.e., this embodiment of the present invention reduces repair expenses and lessens anxiety.

The LIDAR situational awareness functionality is operatively associated with the inflation valves fluidly coupled to the bellow piles or bellow strips, wherein these bellow elements are urged to an expanded condition automatically in response to the object within the vicinity or when the vehicle is about to struck by another vehicle. The bellow elements inflated in the expanded condition can absorb the possible impact. The LIDAR situational awareness functionality may embody electronic highspeed timer to facilitate the calculation of instant velocities and accelerations so as to determine the timing of possible impacts.

SUMMARY OF THE INVENTION

In one aspect of the present invention, a vehicular door apron includes the following: a bellow strip having accordion walls defining a cavity, the bellow strip movable between a uninflated condition and an expanded condition; a vehicle-facing surface of the bellow strip; and an inflation valve along the vehicle-facing surface in such a way as to be fluidly coupled to the cavity, wherein the expanded condition extends at least two inches further from the vehicle-facing surface than the uninflated condition; one or more magnetizable material along the vehicle-facing surface; a hook clip at each end of the bellow strip, wherein each hook clip has a compression clip along an inner surface of a hook portion of the hook clip, wherein each hook clip has a magnetizable material along an inner surface of a hook portion of the hook clip.

In another aspect of the present invention, a vehicular door apron includes the following: a strip of material; a plurality of bellow piles spaced apart along the strip of material, each bellow pile having accordion walls defining a cavity, the bellow pile movable between a uninflated condition and an expanded condition; and for each bellow pile, an inflation valve through the strip of material in such a way as to be fluidly coupled to the cavity, wherein the expanded condition extends at least two inches further from the strip of material than the uninflated condition; one or more magnetizable material along the strip of material; a hook clip at each end of the bellow strip, wherein each hook clip has a compression clip along an inner surface of a hook portion of the hook clip, wherein each hook clip has a magnetizable material along an inner surface of a hook portion of the hook clip.

In yet another aspect of the present invention, a vehicular apron system, includes the following: a bellow element having accordion walls defining a cavity, the bellow element movable between an uninflated condition and an expanded condition; a vehicle-engaging surface of the bellow element; an inflation valve along the vehicle-engaging surface in such a way as to be fluidly coupled to the cavity; and at least one LIDAR component operatively associated with the inflation valve for moving the bellow element to the expanded condition, wherein the expanded condition extends at least two inches further from the vehicle-engaging surface than the uninflated condition, wherein each LIDAR component is configured to determine an object occupies a space within a selectively set distance from said vehicle-engaging surface, and wherein the LIDAR component urges the expanded condition upon determination of said occupation; furthermore, the system enables wherein each LIDAR component is configured to network with other LIDAR components to enable a bird's eye view, and wherein each LIDAR component enables a video output of the bird's eye view.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a vehicular apron attached to an exterior surface of a door of a vehicle so as to extend the length of said door, thereby absorbing damage that would otherwise be imparted into the underlying door. The clips at each end of the vehicular apron may be slipped on and off of the lip of the door only when the door is in an open position, whereby unintentional removal of the vehicular apron is nearly impossible when the door is in the closed position. Magnets along an inward first surface may also secure the vehicular apron to the door. The outward-facing surface of the vehicular apron may provide a display indicium for conveying messages.

Figure 1A:
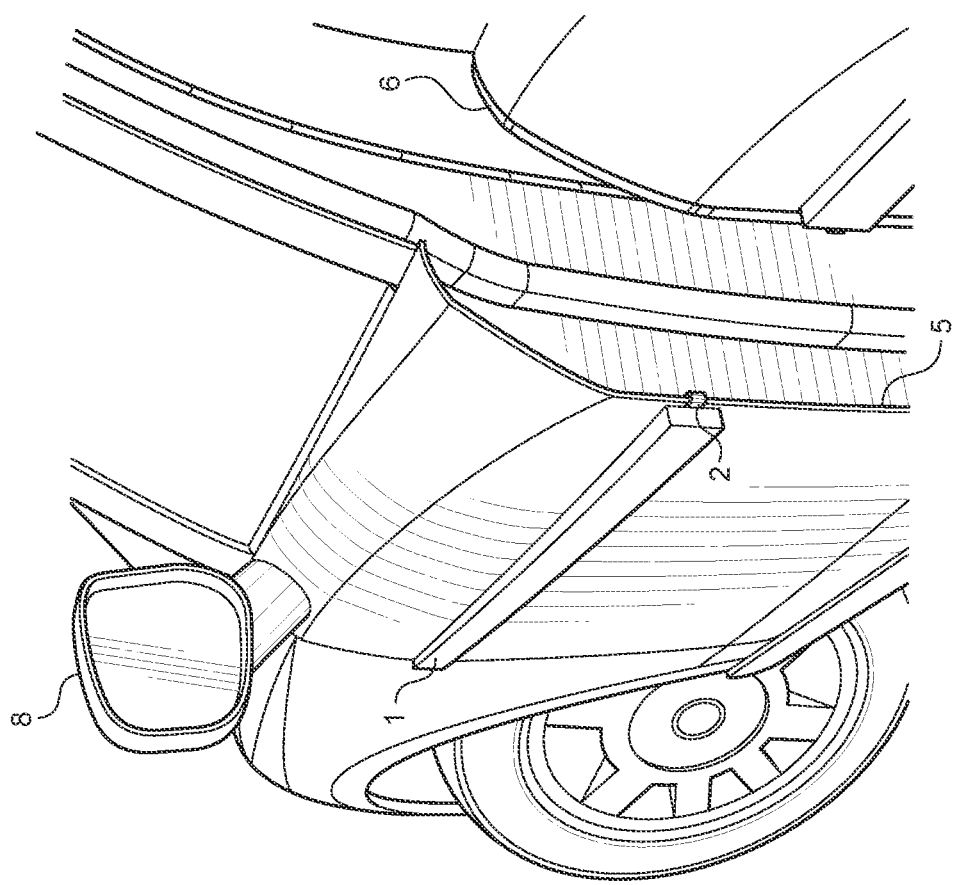
FIG. 1A is a perspective view of an exemplary embodiment of the present invention, shown in use.
Figure 1B:
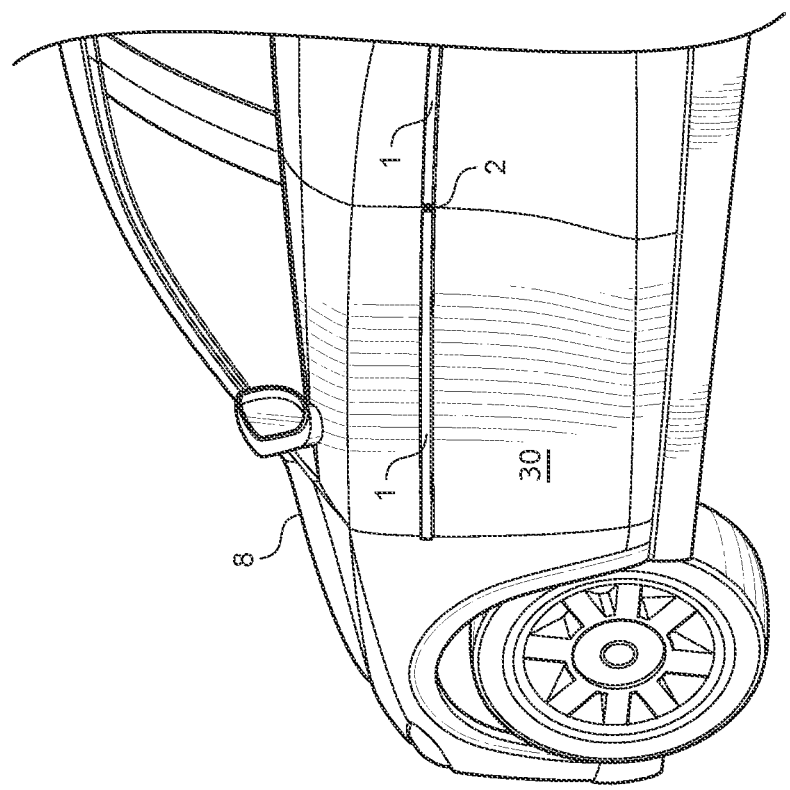
FIG. 1B is a perspective view of an exemplary embodiment of the present invention, shown in use with a vehicular door ajar.
Figures 2A, 2B, 2C, 2D:
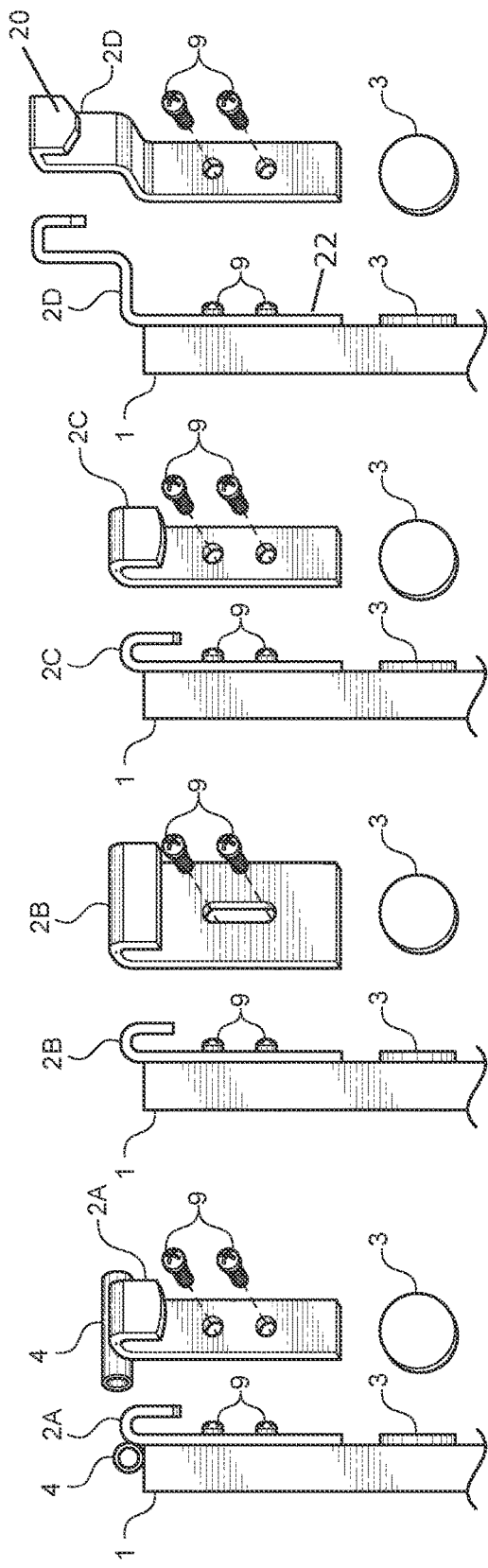
FIG. 2A shows various views of an exemplary embodiment of the present invention with a protective conduit attachment 4.
FIG. 2B shows various views of a wide-style embodiment of the present invention.
FIG. 2C shows various views of an exemplary embodiment of the present invention without the protective conduit attachment 4.
FIG. 2D shows various views of a door drain well embodiment of the present invention.
Figure 3:
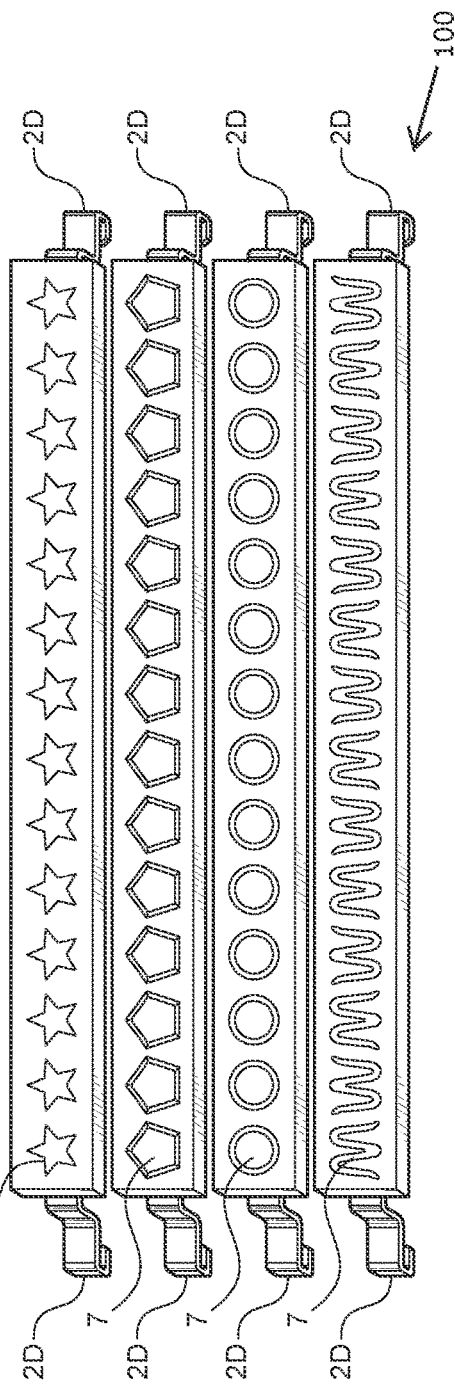
FIG. 3 shows perspective views of various exemplary embodiments of display indicium 7 of the present invention.

It should be understood by those skilled in the art that the use of directional terms such as upper, lower, upward, downwardly, top, left, right and the like are used in relation to the illustrative embodiments as they are depicted in the FIG. 1A, the upward direction (or upper) being toward the top of the corresponding figures, downward direction being toward the bottom of the corresponding figures.

Referring to FIGS. 1A through 10, the present invention may include a vehicular apron 100 having an elongated strip of material 1 providing an elongated first surface and an elongated second surface. At each opposing end of the elongated strip of material 1 a clip 2A, 2B, 2C, or 2D is provided. Each clip 2A, 2B, 2C, or 2D extends outward from the ends of the strip of material 1. At a distal end of the clip 2A, 2B, 2C, or 2D a hook portions 20 is provided. The hook portion 20 may provide the 2A, 2B, and 2C types of clips with a J-shape. While the wide-style type clip 2BA may be approximately twice as wide as type 2A clip. Clip 2A may have dimensions of one inch by one and on-quarter inch. The door drain well type of clip 2D provides an additional 'step' before providing the hook portion. The clips 2A, 2B, 2C, or 2D are dimensioned and adapted to securely engage a lip of the door of a vehicle 8, when said door is open, while having a thin profile so that the hook portion 20 does not contact the door drain well 6 of the vehicle 8 when said door is in the closed position.

The clips 2A, 2B, 2C, or 2D are attached to the ends of the strip of material 1 by way of fasteners 9 through holes or slots on the first surface of the strip of material 1. On the opposing second surface of the strip of material 1, display indicium 7 may be provided. The display indicium 7 may be a display or message, include advertisement that the owner of the vehicle wants to convey. The second surface of the strip of material 1 may be various colors so as to complement or match the color of the underlying vehicle 8.

Figure 4:
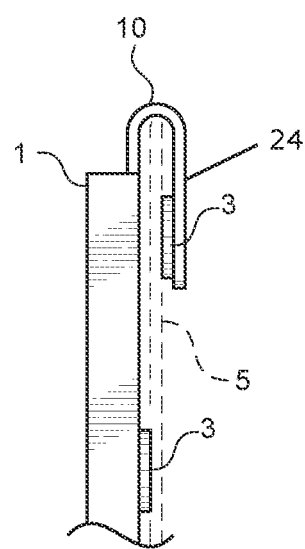
FIG. 4 is a detailed elevation view of an exemplary embodiment of a magnetized material attachment of the present invention.
Figure 5:
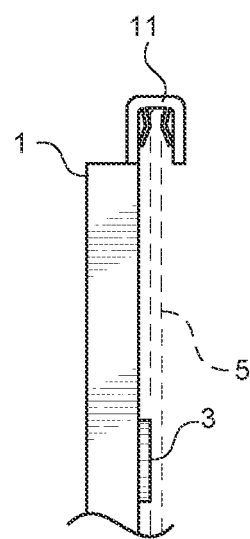
FIG. 5 is a detailed elevation view of an exemplary embodiment of a compression clip attachment of the present invention.
Figure 6:
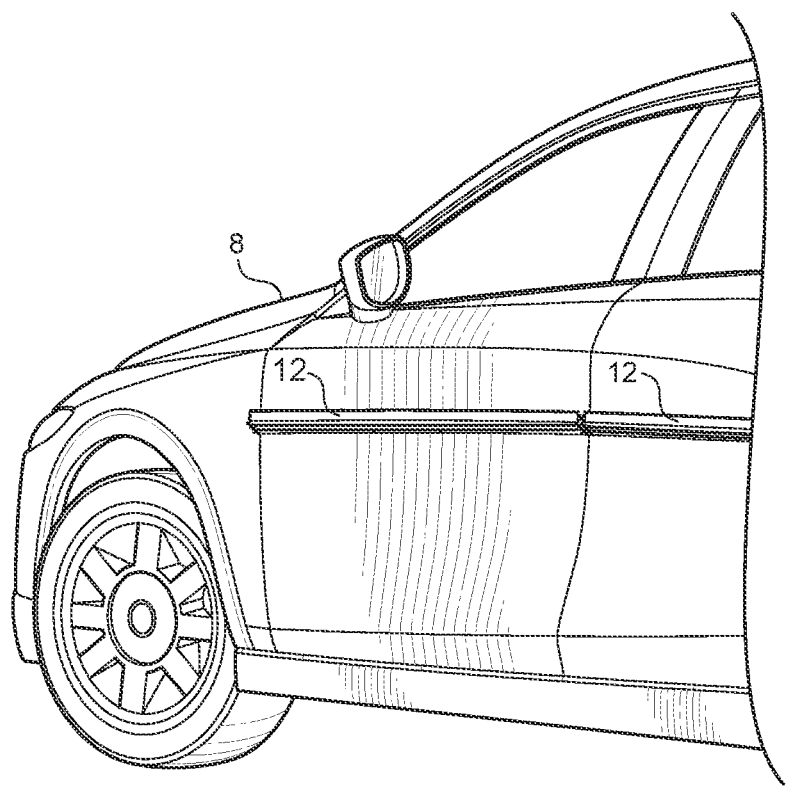
FIG. 6 is a perspective view of an exemplary embodiment of a bellow strip of the present invention shown in use in an expanded condition.

As illustrated in FIGS. 2A through 2D, just inward of the straight leg 22 of the clip 2A, 2B, 2C, or 2D may be magnetizable material 3 that interconnects the strip of material 1 to the door 30 of the vehicle. As illustrated in FIG. 4, the extended clip 10 may extend substantially the full length of the strip of material 1 and there may be a magnetizable material 3 on an outward facing surface of the 'leg' extended clip 10 and another magnetizable material 3 may be along the outward facing surface of the curved J-portion 24.

Alternatively, a compression clip 11 may be inside the hook portion of the hook 2 so that a distal end of the lip 5 is gripped therein.

A protective conduit attachment 4 may attach at the junction of the hook portion of clip 2A and the end of the strip of material 1. The protective conduit attachment 4 or "bumper guard" is dimensioned and adapted to prevent damage to other objects when opening the door of the vehicle. For example, the wind may forcefully open the vehicle door at a greater rate of speed and the longest length of the door strikes another car, for instance. The protective conduit attachment 4 may have an inner diameter of one-quarter inch and an outer diameter of seven-sixteens of an inch.

Figure 7A:
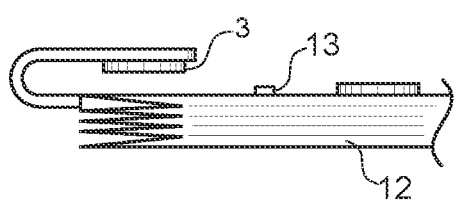
FIG. 7A is a detailed elevation view of an exemplary embodiment of the bellow strip in an uninflated condition.
Figure 7B:
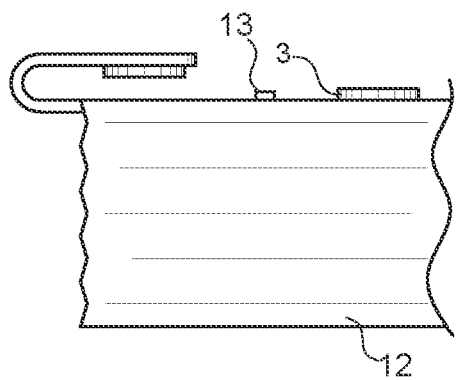
FIG. 7B is a detailed elevation view of an exemplary embodiment of the bellow strip in the expanded condition.
Figure 8:
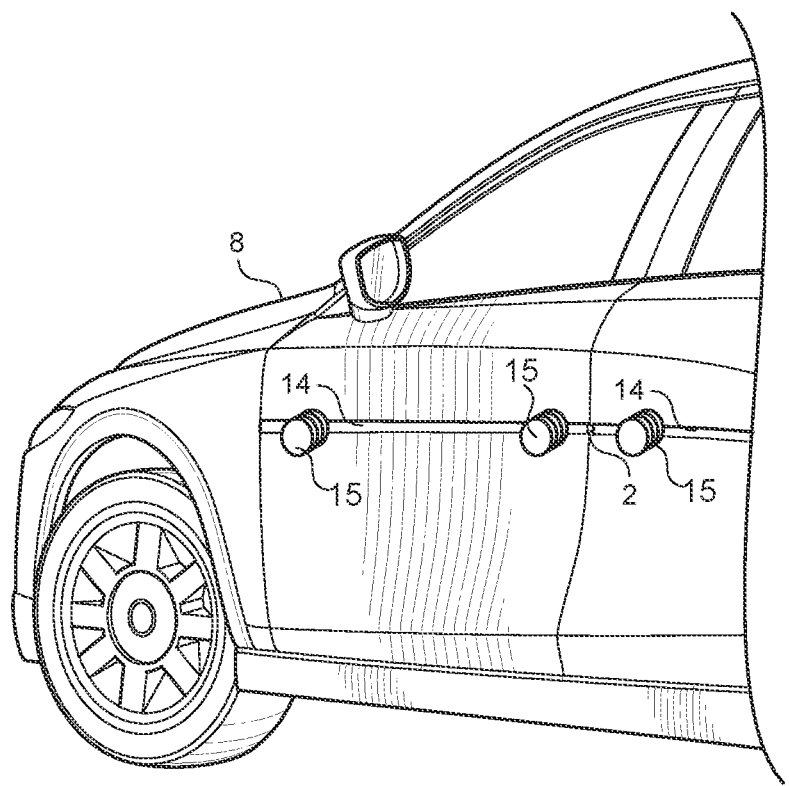
FIG. 8 is a perspective view of an exemplary embodiment of a bellow pile of the present invention shown in use in an expanded condition.
Figure 9A:
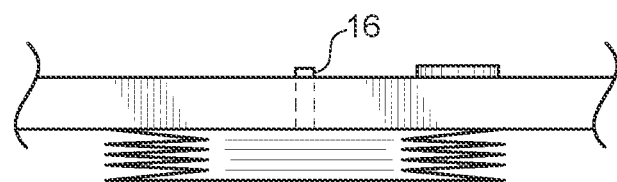
FIG. 9A is a detailed elevation view of an exemplary embodiment of the bellow pile in a uninflated condition.
Figure 9B:
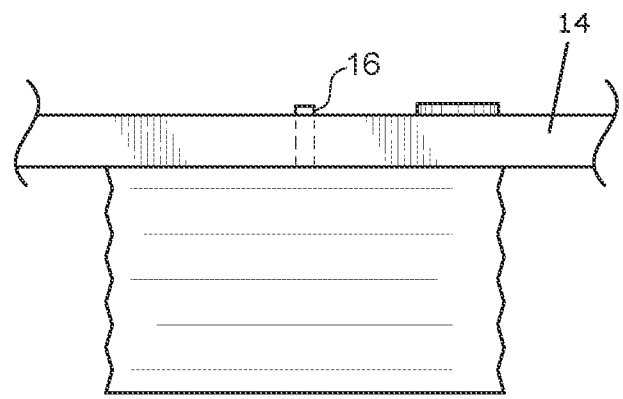
FIG. 9B is a detailed elevation view of an exemplary embodiment of the bellow strip in the expanded condition.
Figure 10:
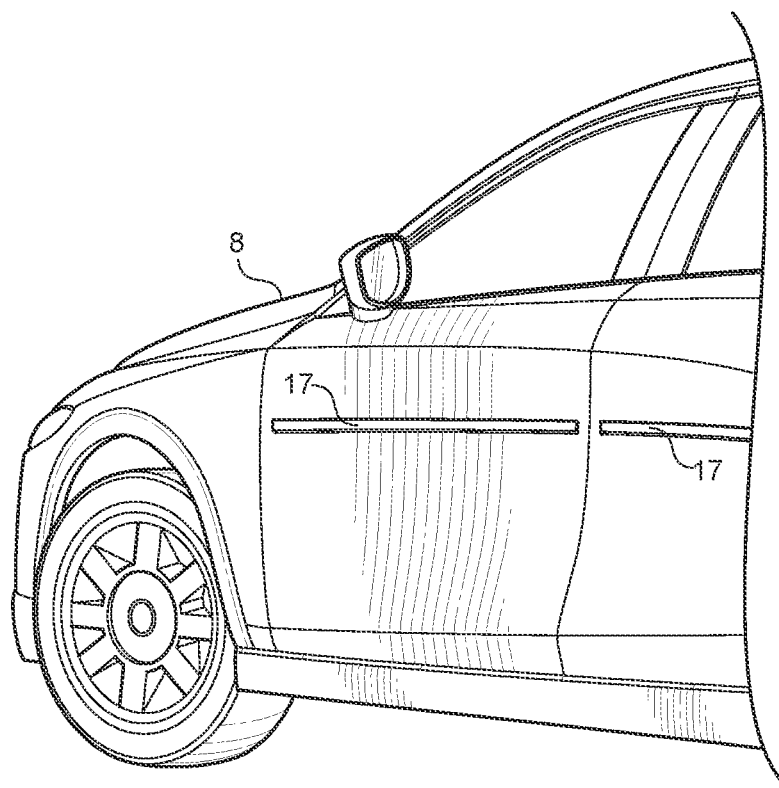
FIG. 10 is a perspective view of an exemplary embodiment of the present invention illustrating installation.

Another embodiment of the present invention provides bellow strips 12 and/or bellow piles 15 along a valve strips 14 of material. The bellow strips 12 or the valve strips 14 may be attached to the vehicular door 30 as described above. The bellow strips and piles 12 and 15 have an operatively associated inflation value 13 or 16, respectively. The inflation valve 13 or 16 may be journaled through a hole in the valve strips 14, as illustrated in FIGS. 9A and 9B. In certain embodiments, the clips 2A through 2D may terminate at and connect to an end the bellow strip 12, as illustrated in FIGS. 7A and 7B, and a magnetizable material 3 may be attached to the bellow strip 12. In effect, the valve strips 14 is not needed with the bellow strip 12.

The bellow strips and piles 12 and 15 are expanded between a uninflated condition and a uninflated condition through urging air through the inflation valve 13 and 16, wherein the expanded condition the bellow strips and piles 12 and 15 may expand up to three inches (in an outward direction orthogonal to the longitudinal axis of the leg 22 of the clip 2, the strip of material 1, and the valve strip 14) relative to the uninflated condition as illustrated in FIGS. 9A and 9B, while the uninflated condition may extend only ½ an inch. Air may be urged into the bellows 12 and 15 by way of a pump (not shown), and air may be urged out by pressing on the inflation valve. The bellow piles 15 may be cylindrical with a diameter between two to four inches. The bellows 12 and 15 may have accordion sidewalls to facilitate both the flat and expanded condition.

The material of the strip of material 1 may be vinyl, metallic materials, various plasticized materials, rubber or other sufficiently durable material capable of acting as a bumper when impacted by an object, thereby absorbing the dents that would otherwise be formed in the underlying door either when that door is opened into another object or when another object contacts the door.

A method of using the present may include the following. The vehicular apron 100 disclosed above may be provided. A user may slide the clip 2A, 2B, 2C, or 2D under the lip 5 in the door edge of the vehicle 8 so that the elongated strip of material 1 extends substantially a length of said door, generally along the most outward portion thereof. Additionally, the magnet 3 on each end, and possibly spaced apart along the first surface, further removably secures the vehicular apron 100 to the door, preventing superficial damage thereto. Additionally, the second surface/side can provide advertisement or display other messages through the display indicium 7 thereon.

Figure 11:
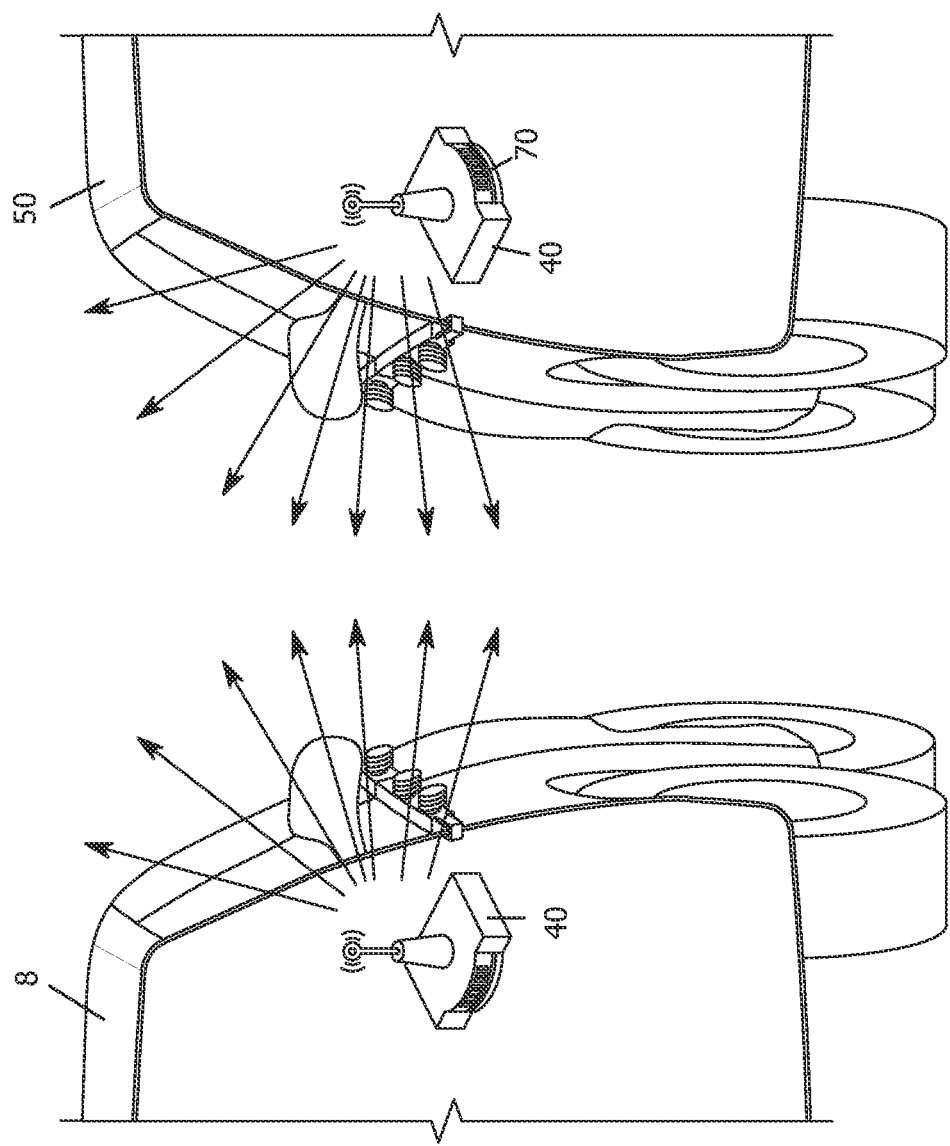
FIG. 11 is a perspective view of an exemplary embodiment of the present invention illustrating a LIDAR situational awareness functionality.

Referring the FIG. 11, the present invention in one embodiment uses a LIDAR component 40 to enable a situational awareness functionality, wherein the system can measure and make the overall systemic bellow strips 12 and bellow piles 15 responsive to an object 50 within a range selectively set by the user. LIDAR determines ranges (variable distance) by targeting the object with a laser and measuring the time for the reflected light to return to the receiver. This situational awareness can be used in numerous advantageous manners including notifying the vehicle owner via video that someone is about to enter the vehicle 8, that a pedestrian is within a predetermined distance of the vehicle as well as there is another vehicle 50 within another set predetermined distance and about to possibly impact the vehicle 8.

The LIDAR situational awareness functionality reduces the expense that would otherwise have to be paid for if the vehicle owners was not aware of the proximity of threats—i.e., this embodiment of the present invention reduces repair expenses and lessens anxiety.

The LIDAR situational awareness functionality is operatively associated with the inflation valves 13 fluidly coupled to the bellow piles 15 or bellow strips 12, wherein these bellow elements are urged to an expanded condition automatically in response to the object within the vicinity or when the vehicle 8 is about to struck by another vehicle. The bellow elements inflated in the expanded condition can absorb the possible impact. The LIDAR situational awareness functionality may embody electronic highspeed timer 70 to facilitate the calculation of instant velocities and accelerations so as to determine the timing of possible impacts.

Figure 12:
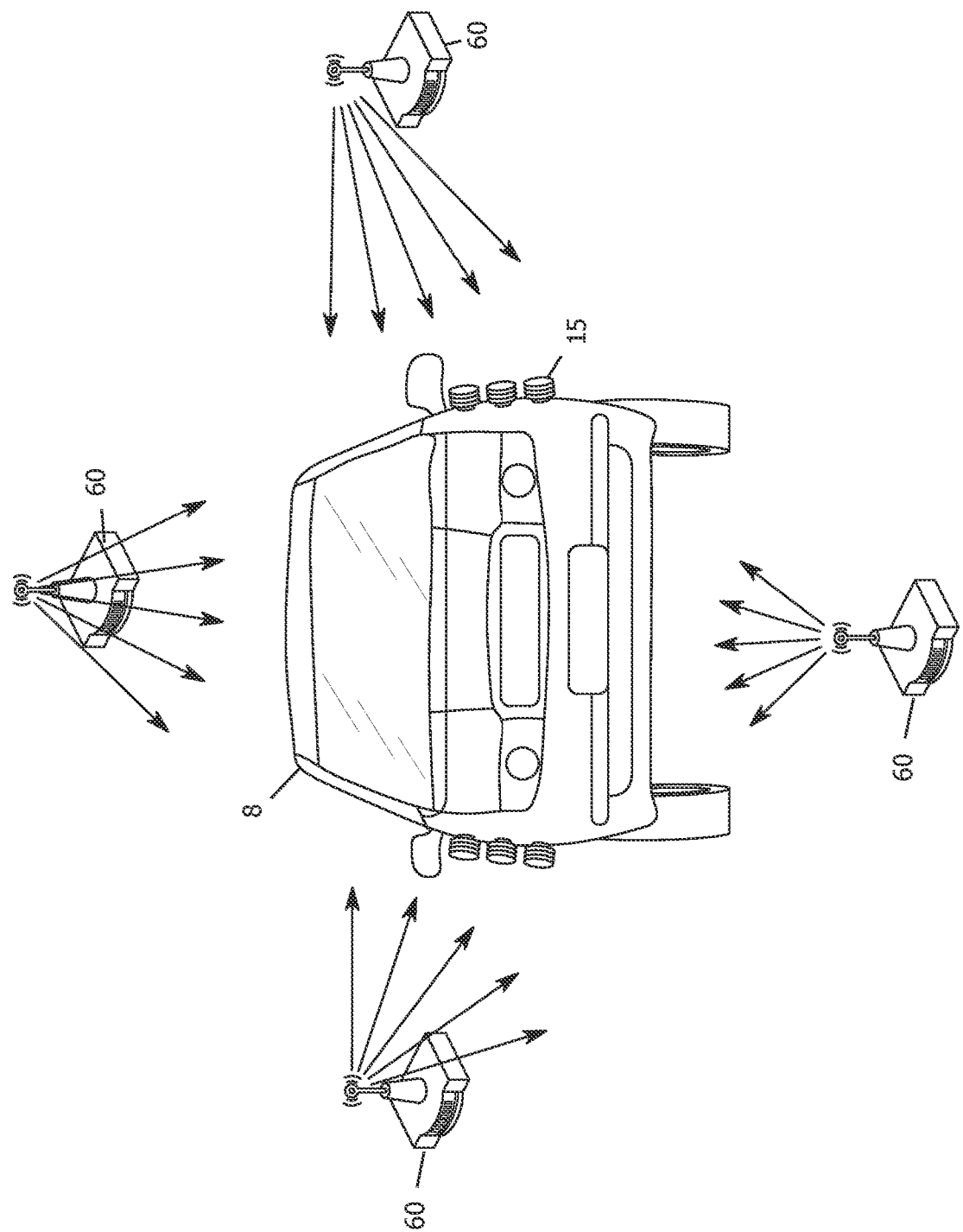
FIG. 12 is a schematic view of an exemplary embodiment of the present invention illustrating the LIDAR situational awareness functionality, wherein a network of LIDAR components facilitates a bird's eye view.

Referring the FIG. 12, a network of LIDAR components 60 may facilitate a birds eye view of the left, right, rear, front, top and bottom of the vehicle 8 so that the LIDAR situational awareness functionality can protect all aspects of the vehicle 8 against innumerable threats, for example an object on the road. It should be understood that FIG. 12 is presenting the networked LIDAR components 60 spaced apart from the vehicle 8 to convey the birds eye view, wherein the actual physical networked LIDAR components 60 are selective place along the body of the vehicle to enable such functionality.

Even though the Figures show the bellow strips and piles 12 and 15, when in the uninflated condition, as protruding from the exterior surface of the vehicle 8, it should be understood that in certain embodiments, when in the uninflated condition the bellow strips and piles 12 and 15 are flush or just inward of the exterior surface of the vehicle. As a result, only in the expanded condition are the bellow strips and piles 12 and 15 protruding beyond the exterior surface of the vehicle 8 to intercept impact of an object 50, such as the door of another vehicle.

The LIDAR components and network of LIDAR components 60 may be facilitated by a computing device loaded with software. In certain embodiments, the network may refer to any interconnecting system capable of transmitting audio, video, signals, data, messages, or any combination of the preceding. The network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

The server and the computer of the present invention may each include computing systems. This disclosure contemplates any suitable number of computing systems. This disclosure contemplates the computing system taking any suitable physical form. As example and not by way of limitation, the computing system may be a virtual machine (VM), an embedded computing system, a system-on-chip (SOC), a single-board computing system (SBC) (e.g., a computer-on-module (COM) or system-on-module (SOM)), a desktop computing system, a laptop or notebook computing system, a smart phone, an interactive kiosk, a mainframe, a mesh of computing systems, a server, an application server, or a combination of two or more of these. Where appropriate, the computing systems may include one or more computing systems; be unitary or distributed; span multiple locations; span multiple machines; or reside in a cloud, which may include one or more cloud components in one or more networks. Where appropriate, one or more computing systems may perform without substantial spatial or temporal limitation one or more steps of one or more methods described or illustrated herein. As an example and not by way of limitation, one or more computing systems may perform in real time or in batch mode one or more steps of one or more methods described or illustrated herein. One or more computing systems may perform at different times or at different locations one or more steps of one or more methods described or illustrated herein, where appropriate.

In some embodiments, the computing systems may execute any suitable operating system such as IBM's zSeries/Operating System (z/OS), MS-DOS, PC-DOS, MAC-OS, WINDOWS, UNIX, OpenVMS, an operating system based on LINUX, or any other appropriate operating system, including future operating systems. In some embodiments, the computing systems may be a web server running web server applications such as Apache, Microsoft's Internet Information Server™, and the like.

In particular embodiments, the computing systems includes a processor, a memory, a user interface and a communication interface. In particular embodiments, the processor includes hardware for executing instructions, such as those making up a computer program. The memory includes main memory for storing instructions such as computer program(s) for the processor to execute, or data for processor to operate on. The memory may include mass storage for data and instructions such as the computer program. As an example and not by way of limitation, the memory may include an HDD, a floppy disk drive, flash memory, an optical disc, a magneto-optical disc, magnetic tape, a Universal Serial Bus (USB) drive, a solid-state drive (SSD), or a combination of two or more of these. The memory may include removable or non-removable (or fixed) media, where appropriate. The memory may be internal or external to computing system, where appropriate. In particular embodiments, the memory is non-volatile, solid-state memory.

The user interface includes hardware, software, or both providing one or more interfaces for communication between a person and the computer systems. As an example and not by way of limitation, an user interface device may include a keyboard, keypad, microphone, monitor, mouse, printer, scanner, speaker, still camera, stylus, tablet, touch-screen, trackball, video camera, another suitable user interface or a combination of two or more of these. A user interface may include one or more sensors. This disclosure contemplates any suitable user interface and any suitable user interfaces for them.

The communication interface includes hardware, software, or both providing one or more interfaces for communication (e.g., packet-based communication) between the computing systems over the network. As an example and not by way of limitation, the communication interface may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface. As an example and not by way of limitation, the computing systems may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the computing systems may communicate with a wireless PAN (WPAN) (e.g., a BLUETOOTH WPAN), a WI-FI network, a WI-MAX network, a cellular telephone network (e.g., a Global System for Mobile Communications (GSM) network), or other suitable wireless network or a combination of two or more of these. The computing systems may include any suitable communication interface for any of these networks, where appropriate.

It should be understood, of course, that the foregoing relates to exemplary embodiments of the invention and that modifications may be made without departing from the spirit and scope of the invention as set forth in the following claims.

What is claimed is:

1. A vehicular apron system, comprising:
a bellow element having accordion walls defining a cavity, the bellow element movable between an uninflated condition and an expanded condition;
a vehicle-engaging surface of the bellow element;
an inflation valve along the vehicle-engaging surface in such a way as to be fluidly coupled to the cavity; and
at least one LIDAR component operatively associated with the inflation valve for moving the bellow element to the expanded condition,
wherein the expanded condition extends at least two inches further from the vehicle-engaging surface than the uninflated condition, wherein each LIDAR component is configured to determine an object occupies a space within a selectively set distance from said vehicle-engaging surface, and wherein the LIDAR component urges the expanded condition upon determination of said occupation, and wherein each LIDAR component is configured to network with other LIDAR components to enable a bird's eye view.

2. The vehicular apron system of claim 1, wherein each LIDAR component enables a video output of the bird's eye view.

3. The vehicular apron system of claim 2, further comprising one or more magnetizable material along the vehicle-engaging surface.

4. The vehicular apron system of claim 3, further comprising a hook clip at each end of the bellow element.

5. The vehicular apron system of claim 4, wherein each hook clip has a compression clip along an inner surface of a hook portion of the hook clip.

6. The vehicular apron system of claim 5, wherein each hook clip has a magnetizable material along an inner surface of a hook portion of the hook clip.

7. The vehicular apron system of claim 1, wherein the vehicle-engaging surface of the bellow element is flush or just inward of an exterior surface of the vehicle.

8. The vehicular apron system of claim 7, wherein only in the expanded condition does the bellow element protrude beyond the exterior surface of the vehicle.

* * * * *